United States Patent [19]
Choi

[11] Patent Number: 6,092,206
[45] Date of Patent: Jul. 18, 2000

[54] POWER SUPPLY CONTROL MECHANISM FOR DISPLAY DEVICE

[75] Inventor: Hyeong-Sik Choi, Suwon, Rep. of Korea

[73] Assignee: SamSung Electronics Co., Ltd., Kyungki-do, Rep. of Korea

[21] Appl. No.: 08/995,552

[22] Filed: Dec. 22, 1997

[30] Foreign Application Priority Data

Dec. 21, 1996 [KR] Rep. of Korea ............ 96-69928

[51] Int. Cl.[7] .................................................. G06F 1/32
[52] U.S. Cl. .................... 713/320; 713/324; 713/300
[58] Field of Search .................................. 395/750, 800, 395/501, 502, 555, 560, 275; 713/300, 400, 601, 500, 320, 324, 340

[56] References Cited

U.S. PATENT DOCUMENTS

| | | | |
|---|---|---|---|
| 5,262,933 | 11/1993 | Shyi-hon | 363/49 |
| 5,375,245 | 12/1994 | Solhjell et al. | 395/750 |
| 5,481,732 | 1/1996 | Shahbazi | 395/750 |
| 5,483,154 | 1/1996 | Chen | 324/76.66 |
| 5,579,252 | 11/1996 | Huang | 364/707 |
| 5,615,376 | 3/1997 | Ranganathan | 395/750 |
| 5,808,693 | 9/1998 | Yamashita et al. | 384/554 |

*Primary Examiner*—Glenn A. Auve
*Assistant Examiner*—Tim Vo
*Attorney, Agent, or Firm*—Robert E. Bushnell, Esq.

[57] ABSTRACT

A power supply control mechanism for a display device automatically controls power supply according to the operation of a computer, and includes: an oscillating circuit generating a pulse of a given cycle; an oscillating circuit operation sensor monitoring whether or not the oscillating circuit operates; a power supply sensor outputting a logical product of an output pulse of the oscillating circuit operation sensor according to whether or not the display device is turned on; a digital/analog converter converting an output of the power supply sensor into an analog signal; a power switching unit which switches according to an output of the digital/analog converter; and a pulsewidth modulation integrated circuit for controlling a pulse duty ratio of the power applied to each circuit of the display device according to an output of the power switching unit.

16 Claims, 4 Drawing Sheets

POWER SUPPLY CONTROL MECHANISM FOR DISPLAY DEVICE

CLAIM OF PRIORITY

This application makes reference to, incorporates the same herein, and claims all benefits accruing under 35 U.S.C. §119 from an application for POWER SUPPLY CONTROL MECHANISM FOR DISPLAY DEVICE earlier filed in the Korean Industrial Property Office on Dec. 21, 1996 and there duly assigned Ser. No. 69928/1996.

BACKGROUND OF THE INVENTION

1. Technical Field

The present invention relates to a power supply control mechanism for a display device. More particularly, it relates to a power supply control mechanism for a display device which assures a long life for the display device and prevents a transient response due to frequent switching.

2. Related Art

In a prior arrangement, a user switches on each of a computer and a display device to apply power to them. A monitor converts an output signal of the computer into a video signal so as to let the user visually read data and entered into the computer. Typically, when the person is using the computer and the monitor, he or she has to turn the monitor and the computer on or off individually.

If the computer is turned off first, the screen of the monitor is darkened, and the user may mistakenly think that the monitor is turned off. Although a small light is often provided on the front of the monitor to indicate its on or off condition, the light is not conspicuous, and thus the user may still mistakenly leave the monitor turned on. This increases power consumption and is disadvantageous with respect to the monitor's life. Therefore, there is a need in the prior art for a power supply control mechanism for a display device which keeps a main power of the display device turned on and controls a power saving mode, regulating the power supply of the display device.

SUMMARY OF THE INVENTION

Accordingly, the present invention is directed to a power supply control mechanism for a display device that substantially obviates one or more of the problems due to limitations and disadvantages of the related art.

It is an object of the present invention to provide a power supply control mechanism for a display device which keeps a main power of the display device turned on and controls a power saving mode, regulating the power supply of the display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is disclosed a power supply control mechanism for a display device which automatically controls power supply according to the operation of a computer, including: an oscillating circuit generating a pulse of a given cycle; an oscillating circuit operation sensor monitoring whether or not the oscillating circuit operates; power supply sensor outputting a logical product of an output pulse of the oscillating circuit according to whether or not the display device is turned on; a digital/analog converter for converting an output of the power supply sensor into an analog signal; a power switching unit for switching according to an output of the digital/analog converter; and a pulsewidth modulation integrated circuit for controlling a pulse duty ratio of the power applied to each circuit of the display device according to an output of the power switching unit.

The power switching unit includes: a first transistor which has a base terminal connected to the digital/analog converter, and which is turned on or off in response to an output signal of the digital/analog converter; a second transistor which has a base terminal connected to a collector terminal of the first transistor, and which is turned on or off according to a turned-on or turned-off state of the first transistor; and an optocoupler which is turned on or turned off according to whether or not an electric current flows through an emitter terminal of the second transistor.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention, examples of which are illustrated in the accompanying drawings.

Figure 1:
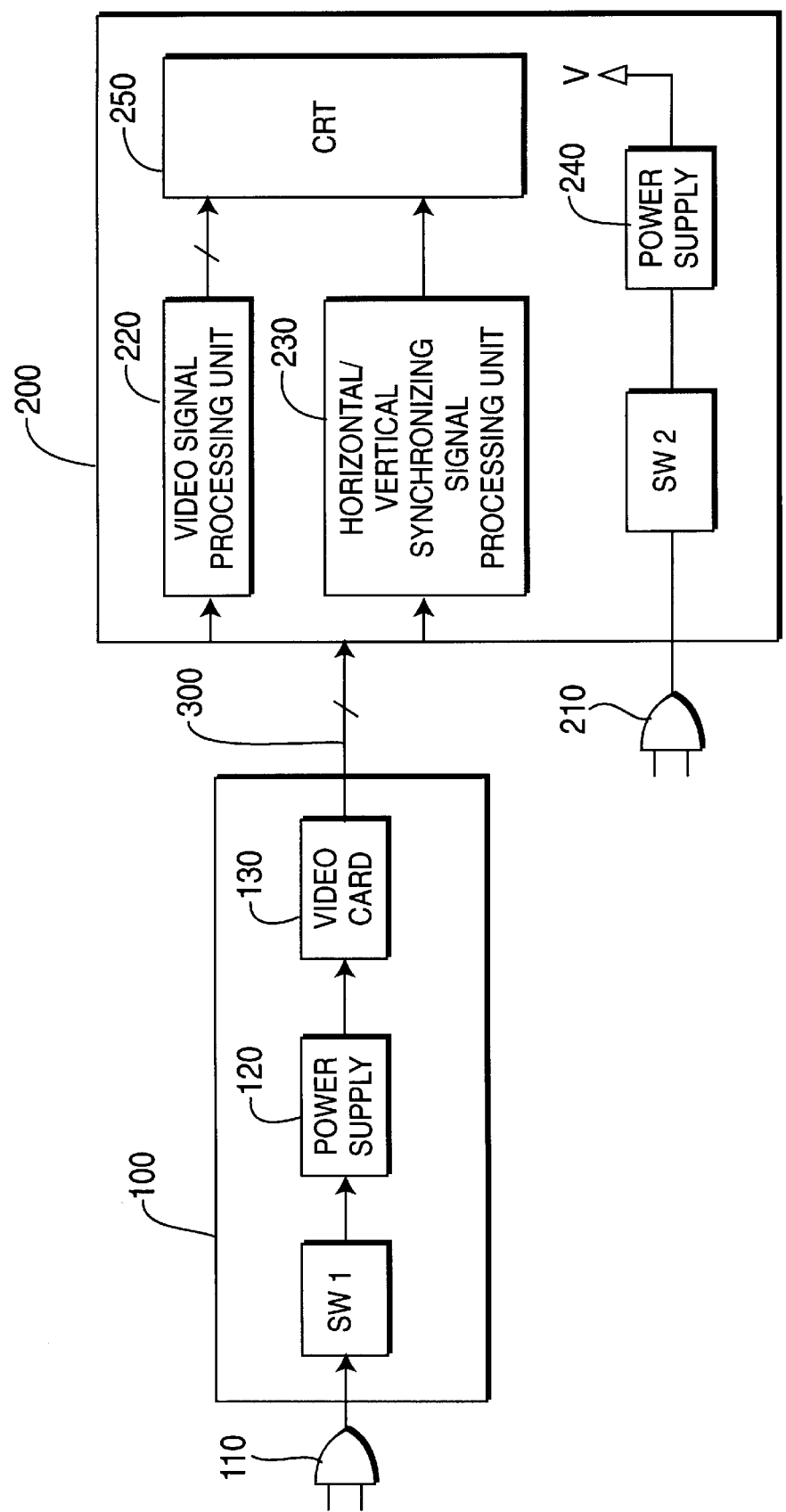
FIG. 1 is a block diagram of a power supply system of a computer system.

FIG. 1 is a block diagram of a power supply control mechanism for a computer. The computer includes a main body 100, a display device 200, and a cable 300 for transmitting a signal from main body 100 to be displayed by display device 200.

Main body 100 includes a power cord 110, a switch SW1 for determining whether or not power is applied to main body 100 through power cord 110, a first power supply unit 120 for controlling the power applied to the computer by the turning on and off of switch SW1, and a video card 130 providing a video signal or a synchronizing signal Sync for supplying the graphic information, made by using the computer, to a computer user.

Display device 200 includes: a power cord 210; a second power supply 240 applying power to next circuit according to whether or not power cord 210 is connected thereto; a video signal processing unit 220 for transmitting a video signal, as received from video card 130 of main body 100, to a cathode ray tube (CRT) 250 through cable 300; and a horizontal/vertical synchronizing signal processing unit 230 either receiving a synchronizing signal Sync as part of a red(R), green(G) or blue (B) video signal that is transmitted through cable 300, or directly receiving synchronizing signal Sync, and applying it to the CRT 250.

In accordance with the prior procedure, an R, G or B video signal and a horizontal/vertical synchronizing signal from the video card 130 of the computer are provided to the display device 200 by turning on the main body 100 of the computer and letting power be applied to the display device 200 through the alternating current (AC) power cord 210. The display device 200, having its own AC power cord 210, displays data on receipt of a signal output from the computer according to switching.

Figure 2:
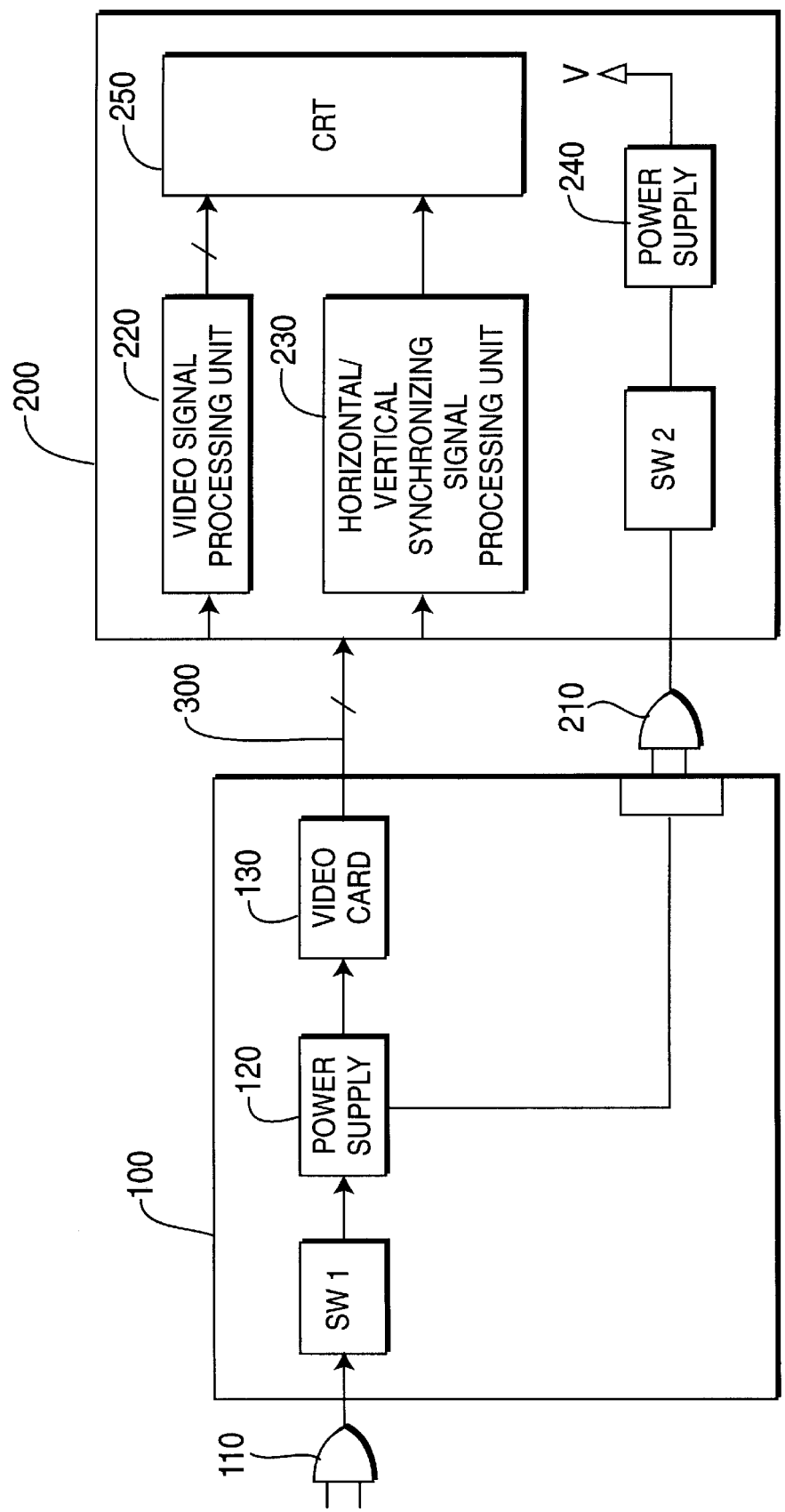
FIG. 2 is a block diagram of another power supply system of a computer system.

FIG. 2 depicts another power supply system of an earlier computer. There is no significant difference between this and the power supply control system of FIG. 1; however, the power is not applied to the display device through the AC power cord 210 from the outside, but is transmitted thereto from the first power supply 120. In addition, there is no difference between the overall operation and the display operation of FIG. 1 and those of FIG. 2; however, in FIG. 2, the display device is turned on or turned off by using switch SW1 connected to the computer main body 100. That is, switches SW1 and SW2 in the computer main body 100 and the display device 200, respectively, should both be manipulated in order to turn on the computer and display device. According to a generally used method, the computer main body 100 is turned on or turned off with switch SW1, with the power of the display device 200 being turned on all the time.

Once computer main body 100 is turned on, power is applied to the computer's internal circuit from the power supply 120 and transmitted to power cord 210 of the display device 200 and second power supply 240 by way of the power supply line.

In order to use an earlier computer, a user switches on each of the computer and the display device, to apply power to them. A monitor, which is a display device for a computer, converts an output signal of the computer into a video signal to let a user visually read data entered into the computer. Such a monitor can be used by working on the computer main body. That is, the monitor is operated on receipt of an output signal of the computer by using a cable and, when there is no signal input to the monitor, it continues the basic operation without purpose. Accordingly, when a person uses the computer main body, he or she has to turn on or off the monitor and the computer main body individually.

If the computer main body is first a turned off, the screen of the monitor is blackened, and a user may mistake the turned-on state of the monitor for a turned-off one. The monitor has a light emitting diode for indicating the power-on state of the monitor, and since the small light emitting diode is not conspicuous, frequently, the monitor is left turned on. This increases power consumption and is also disadvantageous with respect to the monitor life.

In general, switches SW1 and SW2 depicted in FIGS. 1 and 2 are each inserted into and soldered to printed circuit boards (PcBs) of the main body 100 and monitor 200, respectively. If the switch SW1 of the computer main body 100 is adjacent to a knob located at a given position on the front of the computer case, switch-on or switch-off is carried out by using the knob. If the switch is spaced away from the knob, the knob cannot directly move the switch up or down for turning on/off the computer, and an extra guide must be interposed between the knob and the switch to move the switch up and down.

The switch is not moved up and down unless it keeps a constant interval from the knob; i.e. the switch requires an exact operating interval mechanically. There may be various problems due to poor switching operation as a result of change in the knob's length, an error in joining of the knob with the PCB into which the switch is inserted, a variation of the guide's length, etc.

Since a high voltage of several thousand volts or tens of thousands of volts is applied across an anode of the CRT 250, frequent switch-on or switch-off may adversely affect the life of the display device 200, and a transient response creates short-circuits, thus causing deterioration of internal component performance.

Figure 3:
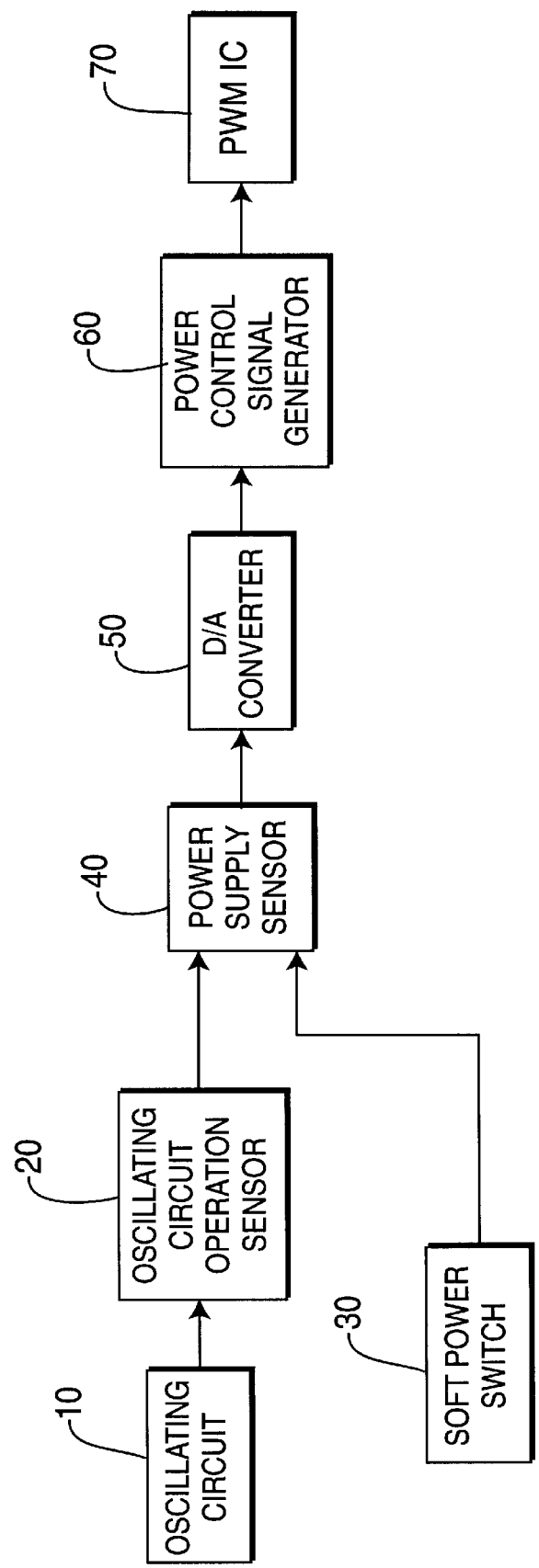
FIG. 3 is a block diagram of a power supply control circuit in accordance with the present invention.

FIG. 3 is a block diagram of a power supply control mechanism for a display device or monitor in accordance with the present invention. As shown in FIG. 3, the power supply control mechanism includes an oscillating circuit 10 installed in a computer (not shown) and generating a pulse signal of a predetermined cycle; an oscillating circuit operation sensor 20 generating a high-level or low-level signal according to whether or not oscillating circuit 10 operates; a soft power switch 30 installed at a predetermined position in the front of the monitor for determining whether or not an output signal of a microcomputer is transmitted to the power supply control mechanism; and a power supply sensor 40 outputting a logical product of an output pulse of oscillating circuit operation sensor 20 according to the turned-on/off state of soft power switch 30.

The power supply control mechanism also includes a digital/analog (D/A) converter 50 which converts the output logical product of power supply sensor 40 into an analog signal; a power control signal generator or switching unit 60 which is used to open and close the circuit according to an output of D/A converter 50; and a pulsewidth modulation-integrated circuit (PWM-IC) 70 for switching by controlling a pulse duty ratio of power applied to each part of the display device according to an output of power switching unit 60.

Figure 4:
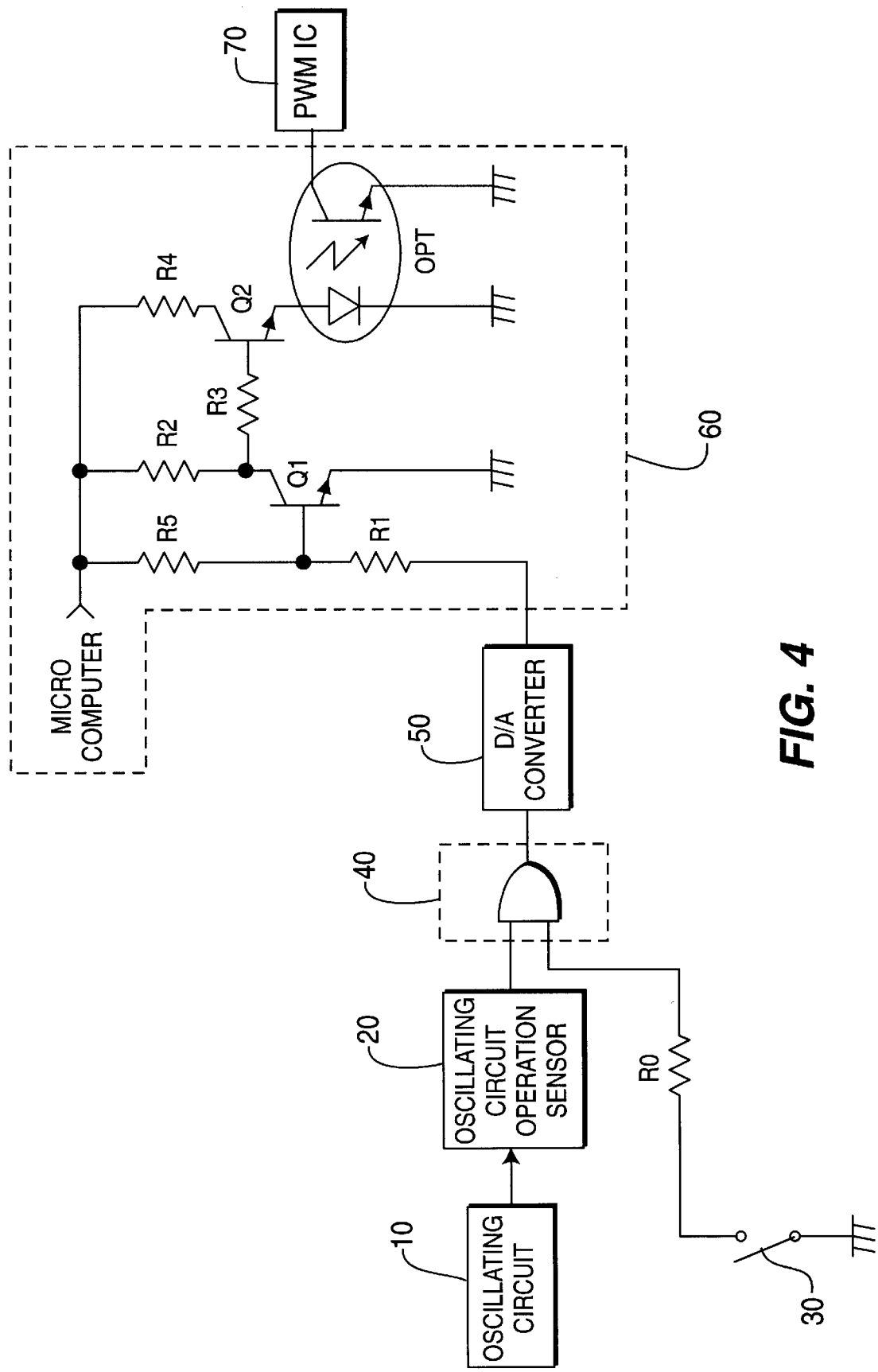
FIG. 4 is a detailed circuit diagram of FIG. 3.

FIG. 4 is a detailed circuit diagram of FIG. 3.

A signal transmitted from a microcomputer (not shown) to the power supply control mechanism within the display device is ON or OFF in accordance with the position of soft power switch 30. This soft power switch 30 is installed at a given point on the front of the display device in the form of a tactile switch. The present invention is realized on the assumption that the microcomputer is turned on even if the power of the display device is being turned off. In other words, even if the power of the display device is turned off or the display device does not have its own power switch, once the power cord is connected to the display device, its microcomputer is in an operating mode all of the time.

The power Vcc, applied to soft switch 30, is furnished from the microcomputer. An AND gate may serve as power supply sensor 40, and power supply sensor 40 performs an AND operation with respect to an ON/OFF signal, corresponding to the operating state of the microcomputer, and an output of oscillating circuit operation sensor 20. That is, if the outputs of both soft switch 30 and oscillating circuit operation sensor 20 are high in level, power supply sensor 40 produces a high-level signal.

Power switching unit 60 includes a resistor R1 for detecting a voltage converted into an analog signal by D/A converter 50; a resistor R5 connected to the other end of resistor R1 for detecting power furnished from the microcomputer; a transistor Q1 having a base terminal connected to a node between resistors R1 and R5, and an emitter terminal grounded; resistors R2 and R3 connected in parallel to a collector terminal of transistor Q1, and resistor R2 having its other end connected to a power supply from the microcomputer; a transistor Q2 having a base terminal connected to resistor R3; a resistor R4 having one end connected to a collector terminal of transistor Q2, and its other end connected to the power supply from the microcomputer; and an optocoupler OPT connected to an emitter terminal of transistor Q2.

The following description relates to the operation of the present invention.

Once soft switch 30 is pressed, a voltage output from the microcomputer is transmitted to power supply sensor 40 through resistor R0. The signal input to power supply sensor 40 is a logical signal obtained by converting an output of a resistor R0 into digital one. A logical product output by power supply sensor 40 varies with an output of each of soft switch 30 and oscillating circuit operation sensor 20. That is, if any one of their outputs is at low level, the logical product of power supply sensor 40 attains a low level. When both of them are at high level, the logical product of power supply sensor 40 attains a high level.

An output signal of oscillating circuit operation sensor 20 varies with the operating state of oscillating circuit 10, generating a pulse of predetermined cycle, and that pulse is input to one terminal of AND gate of power supply sensor 40, the other input of the AND gate receiving the output of soft switch 30.

While the computer keeps on operating, an output of each of oscillating circuit operation sensor 20 and soft switch 30 attains a high level. As a result, an output signal of power supply sensor 40 attains a high level. The output signal of power supply sensor 40 is transmitted to D/A converter 50 to be converted into DC voltage. This DC voltage is detected by resistor R1 and transmitted to the base terminal of transistor Q1. The power of the microcomputer is applied to resistor R5 connected to resistor R1.

Accordingly, as transistor Q1 is turned on, an output voltage of transistor Q1 is distributed to resistors R2 and R3, connected to the collector terminal of transistor Q1, and turns on transistor Q2 via its base connected to resistor R3. Optocoupler OPT, connected to the emitter terminal of transistor Q2, is then turned on, resulting in the output signal of PWM-IC 70, connected to an end of optocoupler OPT, and that output signal allows the display device to operate normally. On the contrary, if the operation of the computer stops (i.e. the power that has been applied across the computer is cut off), oscillating circuit 10 stops. The output signals of both oscillating circuit operation sensor 20 and power supply sensor 40 attain a low level. The voltage transmitted to resistor R1 through D/A converter 50 does not turn on transistor Q1.

As transistor Q1 is turned off, transistor Q2 is turned off, PWM-IC 70 is shut down, and the power to be applied to the display device is cut off. A transformer (not illustrated) is connected to the side so as of PWM-IC 70, so that an output signal of PWM-IC 70 is sent to the transformer's first side and a voltage is applied to the transformer's second side so as to be transmitted to each part of the display device.

As described above, the present invention controls the power supply of the display device according to whether or not a computer is used, which assures a long life for the display device and prevents frequent switching, thus avoiding a transient response.

It will be apparent to those skilled in the art that various modifications and variations can be made in the power supply control mechanism for a display device of the present invention without departing from the spirit or scope of the invention. Thus, it is intended that the present invention cover the modifications and variations of this invention provided they come within the scope of the appended claims and their equivalents.

What is claimed is:

1. A power supply control mechanism for automatically controlling power supplied to a display device according to operation of a computer, comprising:

an oscillating circuit generating a pulse of a given cycle;

oscillating circuit operation sensing means for monitoring whether or not the oscillating circuit operates;

power supply sensing means connected to said oscillating circuit operation sensing means for selectively outputting an output pulse of the oscillating circuit operation sensing means according to whether the display device is turned on or off;

digital/analog converting means connected to said power supply sensing means for converting an output of the power supply sensing means into an analog signal;

power switching means for switching according to the analog signal from the digital/analog converting means and producing an output; and a pulsewidth modulation integrated circuit for controlling a pulse duty ratio of the power supplied to the display device according to the output of the power switching means.

2. The power supply control mechanism of claim 1, wherein said power switching means comprises:

a first transistor having abase terminal connected to the digital/analog converting means, said first transistor being turned selectively on and off in response to the analog signal from the digital/analog converting means;

a second transistor having a base terminal connected to a collector terminal of the first transistor, said second transistor being turned selectively on and off according to a turned-on state and a turned-off state, respectively of the first transistor; and an optocoupler connected to an emitter of the second transistor, said optocoupler being turned selectively on and off according to whether an electric current flows and does not flow respectively, through the emitter of the second transistor.

3. The power supply control mechanism of claim 1, wherein said power supplied sensing means comprises an AND gate connected to a switch mounted on said monitor, said switch being connected to receive power from the computer and generating a switch output when power is received from said computer and said switch is closed, said AND gate performing an AND operation with respect to said output pulse of said oscillation circuit operation sensing means and said switch output.

4. The power supply control mechanism of claim 2, wherein said base terminal of said first transistor is connected to said digital/analog converting means via a first resistor, and said base terminal of said first transistor is connected to the computer via a second resistor.

5. The power supply control mechanism of claim 2, wherein a collector terminal of said second transistor is connected to the computer via a first resistor.

6. The power supply control mechanism of claim 4, wherein a collector terminal of said first transistor is connected to the computer via a third resistor, and said collector terminal of said first transistor is connected to the base terminal of said second transistor via a fourth resistor.

7. The power supply control mechanism of claim 4, wherein a collector terminal of said second transistor is connected to the computer via a third resistor.

8. The power supply control mechanism of claim 6, wherein a collector terminal of said second transistor is connected to the computer via a fifth resistor.

9. A power supply control mechanism for automatically controlling power supply to a display device according to the operation of a computer, comprising:

oscillating circuit means for generating a pulse of a given cycle;

oscillating circuit operation sensing means for sensing when said oscillating circuit means operates and generating an output pulse when operation of said oscillating circuit means is sensed;

power supply sensing means connected to an ON/OFF switch of said display device for generating an output signal when both said output pulse is generated by said oscillating circuit operation sensing means and said ON/OFF switch of said display device is in an ON position;

power switching means for switching according to the output signal from the power supply sensing means and producing an output; and pulsewidth modulation integrated circuit means for controlling a pulse duty ratio of the power supplied to the display device according to the output of the power switching means.

10. The power supply control mechanism of claim 9, wherein said power switching means comprises:

a first transistor having a base terminal connected to the power supply sensing means, said first transistor being turned selectively on and off in response to the output signal from the power supply sensing means;

a second transistor having a base terminal connected to a collector terminal of the first transistor, said second transistor being turned selectively on and off according to a turned-on state and a turned-off state, respectively, of the first transistor; and an optocoupler connected to an emitter of the second transistor, said optocoupler being turned selectively on and off according to whether an electric current flows and does not flow, respectively, through an emitter of the second transistor.

11. The power supply control mechanism of claim 9, wherein said power supply sensing means comprises an AND gate connected to the ON/OFF switch of said display device, said switch being connected to receive power from the computer and generating a switch output when power is received from said computer and said switch is in the ON position, said AND gate performing on AND operation with respect to said output pulse of said oscillation circuit operation sensing means and said switch output.

12. The power supply control mechanism of claim 10, wherein said base terminal of said first transistor is connected to said power supply sensing means via a first resistor, and said base terminal of said first transistor is connected to the computer via a second resistor.

13. The power supply control mechanism of claim 10, wherein a collector terminal of said second transistor is connected to the computer via a first resistor.

14. The power supply control mechanism of claim 12, wherein a collector terminal of said first transistor is connected to the computer via a third resistor, and said collector terminal of said first transistor is connected to the base terminal of said second transistor via a fourth resistor.

15. The power supply control mechanism of claim 12, wherein a collector terminal of said second transistor is connected to the computer via a third resistor.

16. The power supply control mechanism of claim 14, wherein a collector terminal of said second transistor is connected to the computer via a fifth resistor.

\* \* \* \* \*